United States Patent
Manabe et al.

(10) Patent No.: US 9,562,321 B2
(45) Date of Patent: Feb. 7, 2017

(54) END FIXING STRUCTURE OF COMPOSITE WIRE ROD

(71) Applicant: TOKYO ROPE MFG. CO., LTD., Chuo-ku, Tokyo (JP)

(72) Inventors: Daisuke Manabe, Tokyo (JP); Shunji Hachisuka, Tokyo (JP); Hiroshi Kimura, Tokyo (JP); Yoshihiro Tamura, Tokyo (JP)

(73) Assignee: TOKYO ROPE MFG. CO., LTD., Tokyo (JP)

( * ) Notice: Subject to any disclaimer, the term of this patent is extended or adjusted under 35 U.S.C. 154(b) by 0 days.

(21) Appl. No.: 14/673,088

(22) Filed: Mar. 30, 2015

(65) Prior Publication Data
US 2016/0237615 A1 Aug. 18, 2016

Related U.S. Application Data

(63) Continuation of application No. PCT/JP2015/054143, filed on Feb. 16, 2015.

(51) Int. Cl.
*D07B 1/18* (2006.01)
*D07B 1/00* (2006.01)

(52) U.S. Cl.
CPC ............... *D07B 1/18* (2013.01); *D07B 1/005* (2013.01)

(58) Field of Classification Search
CPC ......... F16G 11/02; F16G 11/04; F16G 11/048; Y10T 403/7039; Y10T 403/7052; Y10T 403/7064; Y10T 24/3996; Y10T 24/3909; E04C 5/122; E04C 5/127

(Continued)

(56) References Cited

U.S. PATENT DOCUMENTS 3,220,074 A * 11/1965 Ehmann ................ D07B 1/167
24/115 M
3,254,383 A * 6/1966 Ehmann ................ F16G 11/04
403/275

(Continued)

FOREIGN PATENT DOCUMENTS

JP 45012981 Y1 6/1970
JP 4818649 A 3/1973

(Continued)

OTHER PUBLICATIONS

International Search Report (ISR) dated May 19, 2015, issued in parent International Application No. PCT/JP2015/054143.

(Continued)

*Primary Examiner* — Robert J. Sandy
*Assistant Examiner* — Rowland Do
(74) *Attorney, Agent, or Firm* — Holtz, Holtz & Volek PC

(57) ABSTRACT

An end fixing structure of a composite wire rod includes a composite wire rod, a wedge body formed in a cylindrical shape, whose outside diameter expands from a tip portion subject to a tensile force toward a back end portion on a fixed side, to whose inner wall surface an outer surface of the composite wire rod is transferred, and in which the inner wall surface engaging with the outer surface of the composite wire rod is formed, and a sleeve provided on an outer circumferential side of the wedge body and having an internal structure of a conical hollow whose diameter expands toward the back end portion on the fixed side, wherein the wedge body is formed from a plurality of divided wedge bodies and the inner wall surface is formed from a fine irregularity.

3 Claims, 4 Drawing Sheets

(58) Field of Classification Search
USPC ............ 24/122.6, 130, 131 R, 136 R, 136 L, 115 N, 24/115 M; 403/367–371; 52/223.13, 223.14
See application file for complete search history.

(56) References Cited

U.S. PATENT DOCUMENTS

| | | | | |
|---|---|---|---|---|
| 3,676,899 A * | 7/1972 | Ehlert | ................ | F16G 11/04 403/247 |
| 3,676,900 A * | 7/1972 | De Valenzuela | ........ | E04C 5/122 403/374.2 |
| 3,879,147 A * | 4/1975 | Morell | ................ | E04C 5/122 24/115 M |
| 4,615,532 A * | 10/1986 | Biller | ................ | F16G 11/04 24/115 M |
| 4,835,822 A * | 6/1989 | Savall | ................ | E04C 5/122 24/115 R |
| 5,308,026 A * | 5/1994 | Shaw | ................ | F16G 11/04 24/115 M |
| 5,455,078 A * | 10/1995 | Kanzaki | ................ | B24C 3/32 427/328 |
| 8,425,143 B2 | 4/2013 | Kondo et al. | | |
| 9,086,117 B2 | 7/2015 | Van Der Ende | | |
| 2004/0197478 A1 * | 10/2004 | Takagi | ................ | C23C 18/22 427/306 |
| 2012/0141198 A1 * | 6/2012 | Kondo | ................ | F16G 11/02 403/361 |
| 2012/0240365 A1 | 9/2012 | Van Der Ende | | |
| 2012/0297703 A1 * | 11/2012 | Sentry | ................ | E04C 5/122 52/166 |
| 2014/0341646 A1 * | 11/2014 | Watanabe | ............ | F16G 11/04 403/361 |

FOREIGN PATENT DOCUMENTS

| | | |
|---|---|---|
| JP | 01272889 A | 10/1989 |
| JP | 03229042 A | 10/1991 |
| JP | 08237840 A | 9/1996 |
| JP | 2001165245 A | 6/2001 |
| JP | 5426678 B2 | 2/2014 |
| WO | 2011051678 A2 | 5/2011 |
| WO | 2015125220 A1 | 8/2015 |

OTHER PUBLICATIONS

International Search Report (ISR) dated Mar. 15, 2016, issued in counterpart International Application No. PCT/JP2015/086517.

* cited by examiner

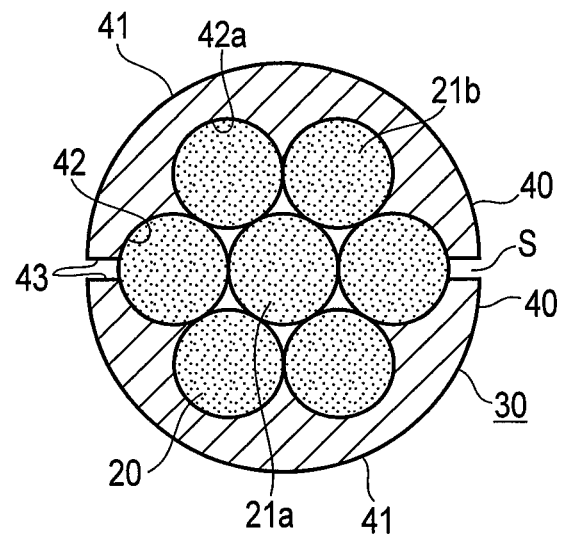
F I G. 5
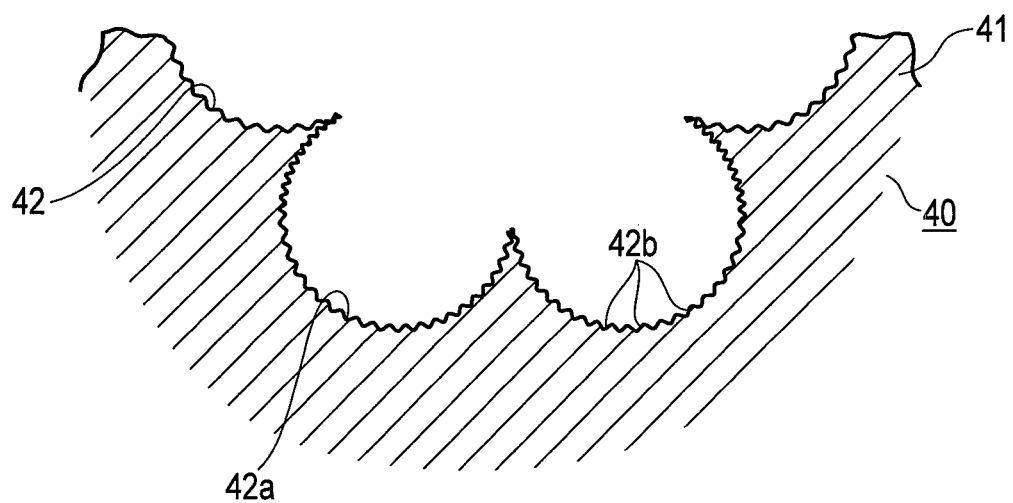
F I G. 6

| No. | 1 | 2 | 3 | 4 | 5 | 6 | 7 | 8 | 9 |
|---|---|---|---|---|---|---|---|---|---|
| Surface roughness Rz (μm) | 200 | 200 | 200 | 30 | 60 | 300 | 500 | 800 | 200 |
| Wedge length (mm) | 130 | 150 | 210 | 150 | 150 | 150 | 150 | 150 | 280 |
| Fixing load (kN) | 196 | 234 | 278 | 170 | 225 | 230 | 210 | 185 | 280 |
| Fixing efficiency (%) | 73 | 87 | 103 | 63 | 83 | 85 | 78 | 69 | 104 |
| Breaking conditions | Broken | Broken | Broken | Pulled out | Broken | Broken | Broken | Pulled out | Broken |
| Evaluation | × | ○ | ○ | × | ○ | ○ | ○ | × | ○ |

FIG. 7

END FIXING STRUCTURE OF COMPOSITE WIRE ROD

CROSS-REFERENCE TO RELATED APPLICATIONS

This application is a Continuation Application of PCT Application No. PCT/JP2015/054143, filed Feb. 16, 2015, the entire contents of which is incorporated herein by reference.

TECHNICAL FIELD

The present invention relates to an end fixing structure of a composite wire rod used for end fixing when the composite wire rod used to reinforce a structure in the field of civil engineering, bridges and the like is tensed.

BACKGROUND ART

The composite wire rod is known as a substitute for a PC-steel stranded, wire. The composite wire rod is formed by converting continuous fiber such as carbon fiber into composite fiber using thermoset resin such as epoxy resin and molding the composite fiber into a stranded wire such as 1×7. The composite wire rod has, like the PC-steel stranded wire, a high tensile strength and a high elastic coefficient and also features such a light weight and non-rusting properties. Making use of these features, the composite wire rod is used as repairing cables of existing bridges, reinforcing tendon of prestressed concrete beams and piles, post-tensioning bridge girder reinforcing materials and the like in the field of civil engineering, bridges and the like. When the composite wire rod is used for such uses, end fixing that grips both ends thereof is needed to tense the composite wire rod.

As an end fixing structure, a technology of a retention end of electric wire using resin reinforced carbon fiber as the core is known (For example, Jpn. Pat. Appln. KOKAI Publication No. 8-237840). That is, a buffer sleeve in a cylindrical two-split structure formed from metallic materials containing zinc or the like as the main component and having an engaging surface engaging with an outer circumference of the resin reinforced carbon fiber on an inner circumferential surface is used as the retention end of a stranded electric wire. In an electric wire in which resin reinforced carbon fiber is used as a tension member and a conductive metal wire is stranded therearound, a buffer sleeve is provided between the tension member and the conductive metal wire stranded layer, a metal sleeve is provided on the outer side thereof, and the metal sleeve is compressed and fixed to form the retention end. In this technology, the buffer sleeve has the engaging surface engaging with the outer circumference of the resin reinforced carbon fiber on the inner circumferential surface and has a two-split structure and so can easily be attached to the resin reinforced carbon fiber and is also molded in a cylindrical shape and so has an effect of preventing damage such as crushing and cracks of the resin reinforced carbon fiber because no local compressive force acts when the metal sleeve is compressed.

Also as the end fixing structure of a composite wire rod, a structure in which the composite wire rod is coated with an antislipping sheet, a blade made of metal is placed thereon, and this portion is fixed by being sandwiched between wedges is known (for example, Japanese Patent No. 5426678). This structure is provided with a function to grip the composite wire rod under high tension without causing damage by shearing due to buffer action by deformation of the antislipping sheet and the blade below the wedges in accordance with an irregularity portion of the composite wire rod when the wedges tighten the composite wire rod by an external force generated in the wedges when the composite wire rod is tensed and a frictional force by the antislipping sheet.

Further, a method of using, instead of the antislipping sheet, a composite cushioning material made of resin is proposed (for example, Japanese Patent No. 01-272889).

DISCLOSURE OF INVENTION

In the aforementioned end fixing structure of a composite wire rod, the following problems arise. That is, to form the retention end of an electric wire formed by conductive metal wires being stranded, a machine device to compress is needed in the above technology. Using the machine device leads to a higher cost. Also, the two-split buffer sleeve shown in the above technology needs to be made of metal containing zinc or the like as the main component to prevent crushing damage of the carbon fiber core where a compressive force arises locally concentratedly.

When a plurality of antislipping sheets is used for the composite wire rod, it is necessary to stack many antislipping sheets in the stage of preparations. When two antislipping sheets in a shape of a strip of paper prepared as described above are mounted on the composite wire rod, the direction of the antislipping sheet needs to be made parallel to the axial direction of the composite wire rod and also the two antislipping sheets need to be mounted by maintaining the interval therebetween equal, requiring skills and time for the work.

Also, the method poses a problem that skilled workers whose number is limited are needed and a lot of time is needed to undergo many complex processes.

Further, when a composite cushioning material is used, the work time can be reduced to about 10 min, but the work time for a fixing structure using the PC-steel stranded wire is about one min and very short and the further reduction of the work time is demanded. In addition, the resin used as a material of the composite cushioning material is deformed or damaged when a large force continuously acts thereon and may not be able to withstand long-term use.

On the other hand, the composite cushioning material made of resin has a large amount of creep, which makes the composite cushioning material inappropriate for fixing provided for long-term use. Further, the resin of the composite cushioning material is creep-deformed, which makes long-term use of the composite cushioning material impossible.

An object of the present invention is to provide an end fixing structure of a composite wire rod capable of easily performing fixing work due to the end fixing structure maintaining a sufficient gripping force without needing a machine device for compression and using an antislipping sheet and a composite cushioning material requiring hard work and also withstanding long-term use.

BRIEF DESCRIPTION OF DRAWINGS

FIG. 5 is a transverse sectional view showing the fixing structure.

FIG. 6 is an enlarged view showing principal portions of the fixing structure.

FIG. 7 is an explanatory view showing a relationship between surface roughness, wedge length, and fixing efficiency.

BEST MODE FOR CARRYING OUT THE INVENTION

An embodiment of the present invention will be described below with reference to the appended drawings.

Figure 1:
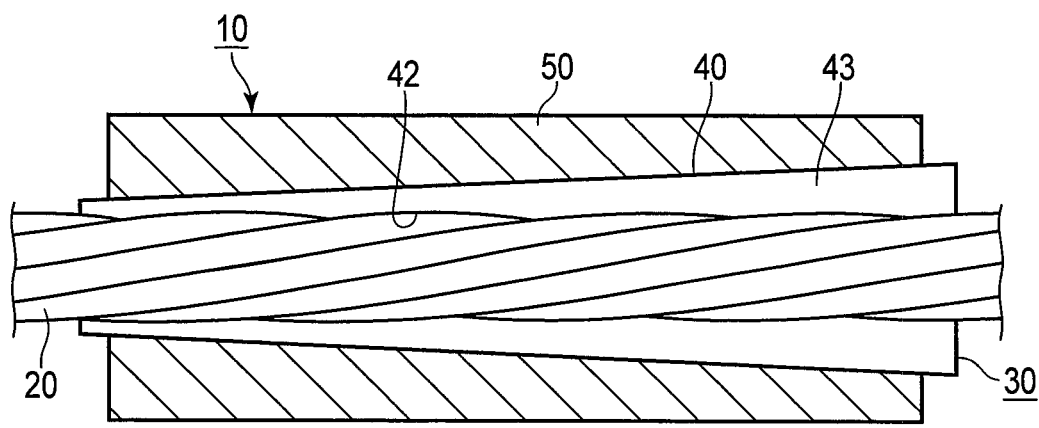
FIG. 1 is a longitudinal sectional view showing a fixing structure of a composite wire rod according to an embodiment of the present invention.
Figure 2:
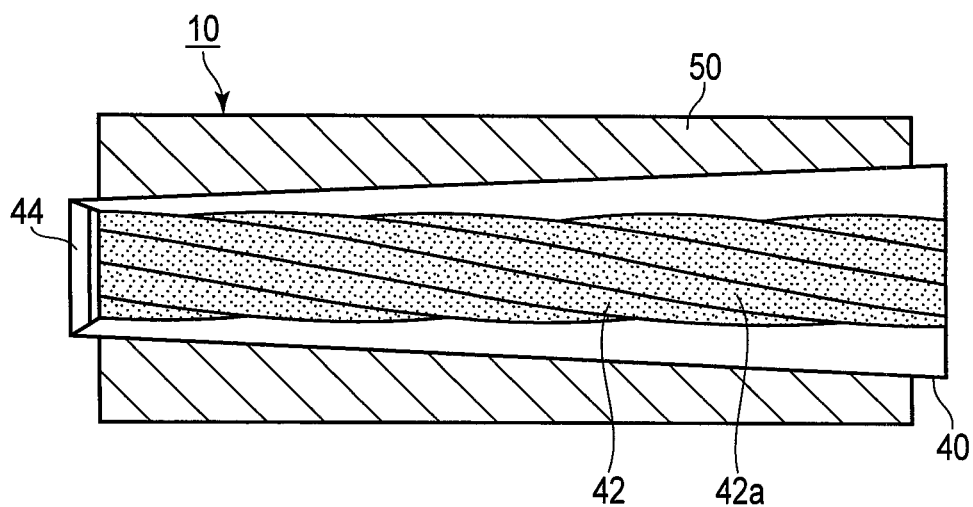
FIG. 2 is a longitudinal sectional view showing a divided wedge body and a sleeve in the fixing structure.
Figure 3:
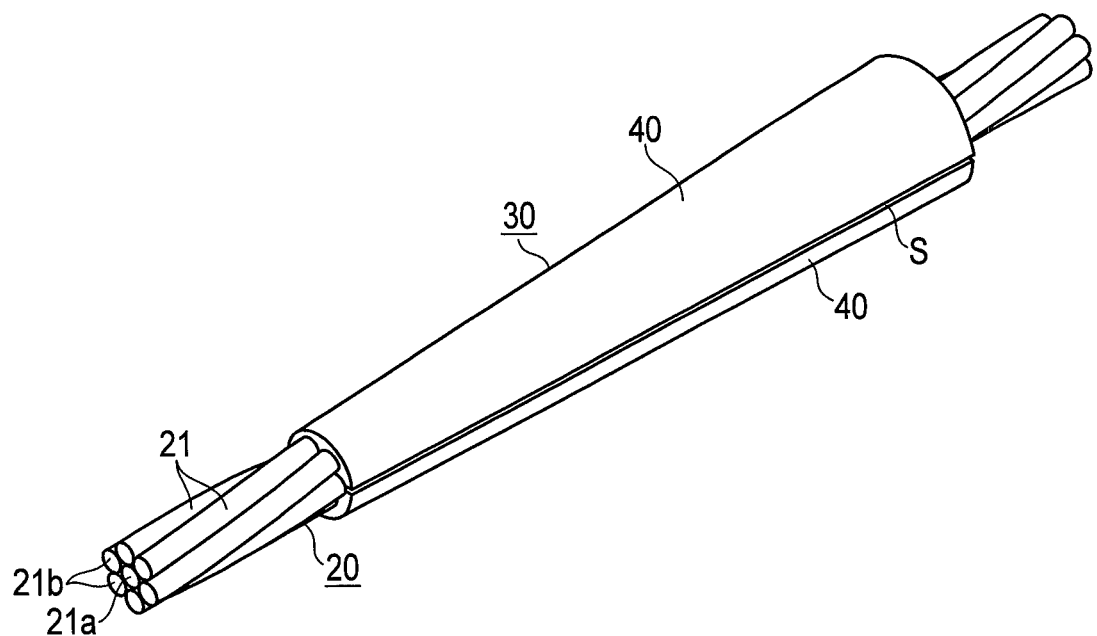
FIG. 3 is a perspective view showing the composite wire rod and the wedge body in the fixing structure.
Figure 4:
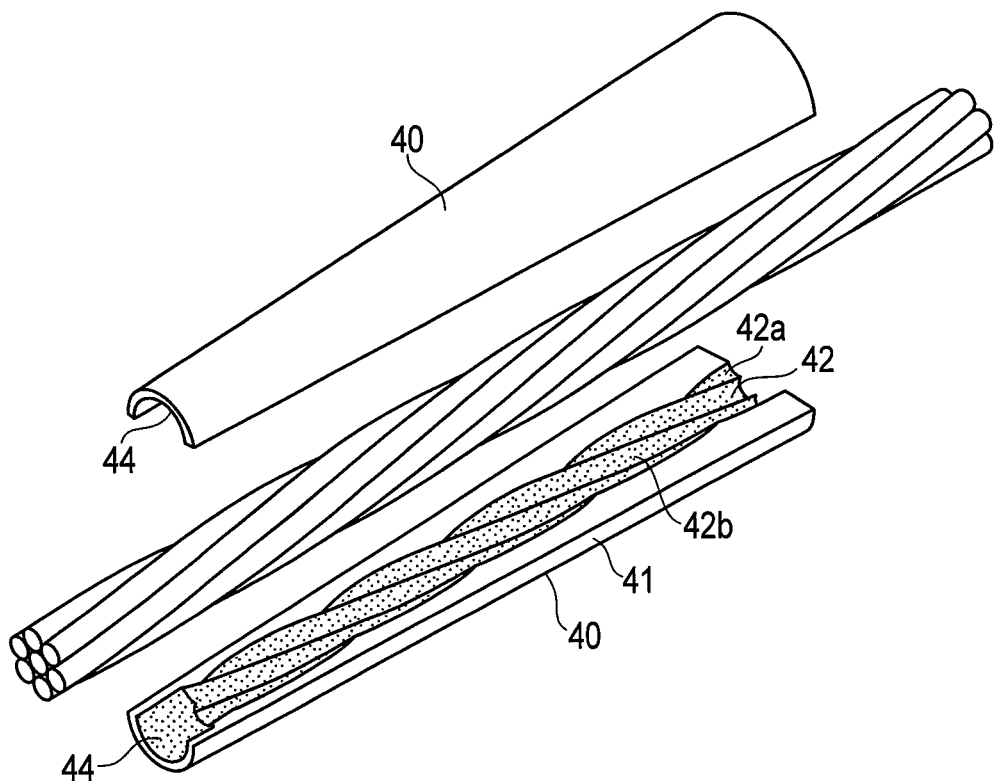
FIG. 4 is an exploded perspective view showing the composite wire rod and the wedge body.

FIG. 1 is a longitudinal sectional view showing a fixing structure of a composite wire rod according to an embodiment of the present invention, FIG. 2 is a longitudinal sectional view showing a divided wedge body and a sleeve in the fixing structure, FIG. 3 is a perspective view showing the composite wire rod and the wedge body in the fixing structure, FIG. 4 is an exploded perspective view showing the composite wire rod and the wedge body, FIG. 5 is a transverse sectional view showing the fixing structure, and FIG. 6 is an enlarged view showing principal portions of the fixing structure. In the description, the axial direction is a (length) direction in which a composite wire rod 20 extends.

An end fixing structure 10 of a composite wire rod includes the composite wire rod 20 formed by converting continuous fiber into composite fiber using resins and molding the composite fiber like a stranded wire, a wedge body 30 covering the composite wire rod 20 and made of metallic materials, and a sleeve 50 provided on the outer circumferential side of the wedge body 30 and made of metallic materials. In FIG. 1, a tensile force acts from the left direction and the right end is a free end. The minor-diameter side as a tensile side of the wedge body 30 is called a tip portion and the major-diameter side as a fixed side is called a back end portion.

The composite wire rod 20 has a structure in which a plurality of wires 21 is stranded. The wire 21 has carbon fiber (continuous fiber) and matrix resin (typically, thermoset resin such as epoxy resin) as its main materials. The composite wire rod 20 having a twist structure of 1×7 of 15.2 mm in outside diameter is configured by stranding six side wires 21b around a core wire 21a as the wire 21. Any of the core wire 21a and the side wires 21b has the diameter of 5.1 mm. The angle formed between the core wire 21a and the side wire 21b, that is, the twist angle is typically 9° and the preferable range of the twist angle is 18° or less.

The inside diameter of the wedge body 30 is determined by the shape of the composite wire rod 20 as a fixed body. Thus, a sufficient length needs to be secured to obtain sufficient fixing efficiency with a pressure to the extent that the composite wire rod 20 is not crushed. A concrete length is determined based on one pitch in which the side wire 21b returns to the same position in the circumferential direction. The determination process will be described later.

The wedge body 30 is formed in the shape of a hollow truncated cone by combining divided wedge bodies 40 divided into two portions in the circumferential direction.

The divided wedge body 40 has a body 41 in a semicylindrical shape and an irregularity portion 42a provided on an inner wall surface (engaging portion) 42 of the body 41 to fit into an external shape of the composite wire rod 20. The irregularity portion 42a has irregularities obtained by transferring the external shape of the wire 21 constituting the composite wire rod 20 and is like so-called knots. In addition to irregularities formed by the transfer of the external shape, as shown in FIG. 6, fine irregularities 42b are formed on the inner wall surface.

A strong frictional force between the composite wire rod 20 and the wedge body 30 is obtained on the inner wall surface 42 due to the knot-like irregularity portion 42a. Further, due to the fine irregularities 42b, the contact area between each of the wires 21 of the composite wire rod 20 increases and also a frictional force of the composite wire rod 20 in the sectional direction is further increased. The fine irregularities 42b realize a strong gripping force and stable fixing for a long period of time.

A tensile test is performed to determine the appropriate surface roughness and wedge length. FIG. 7 shows the relationship of the surface roughness, wedge length, fixing load, fixing efficiency, breaking conditions, and evaluation when the tensile test of a fixing structure by a wedge body is performed by changing the surface roughness and wedge length of the composite wire rod 20. The fixing efficiency is a ratio of the fixing load to the standard breaking load of the composite wire rod. The evaluation is 0 (good) when the fixing efficiency exceeds 75%.

Various methods are available to adjust the surface roughness of the divided wedge body 40, which is a casting, and this time, after the divided wedge body 40 is formed, adjustments are made by postprocessing such that irregularities are added to the surface. The surface roughness is measured by a stylus type surface roughness meter.

The surface roughness Rz (10-point average roughness) of the inner surface forming the fine irregularities 42b may be 60 to 500 μm and the fine irregularities 42b of an appropriate size are formed and, as described above, the frictional force increases and a high fixing load is obtained.

If the surface roughness is too small (Rz=30 μm or less), the size of the fine irregularities 42b is small and the frictional force is weak and the composite wire rod is pulled out. If the surface roughness is too large (Rz=800 μm or more), the fine irregularities 42b are too large and the surface of the composite wire rod 20 is damaged and thus, the fixing load cannot be increased. On the other hand, protuberances of knots transferring valleys between strands are scraped and the contact area decreases markedly and the composite wire rod is pulled out.

Regarding the wedge length, the test is performed by using various lengths of 130 mm, 150 mm, 210 mm, 280 mm under the condition of the surface roughness Rz=200. One pitch of the composite wire rod 20 is 209 mm. The lengths of 150 mm, 210 mm, 280 mm pass the test. When the length is 130 mm or less, the composite wire rod 20 is damaged by a lateral pressure caused by tightening of the wedge body 30 and breaking occurs at a low fixing load. Further, when the length is 200 mm or more corresponding to about one pitch, the frictional area increases and a still higher fixing load is obtained. If the length exceeds 280 mm corresponding to 134% of one pitch, there is almost no practical use. Results of the test show that the appropriate length is 72% to 134% of one pitch.

Further, a divided surface 43 is formed on an end face in the circumferential direction of the body 41. Also, an expanding portion 44 whose diameter expands as the mouth is approached is provided on the tip portion side.

The wedge body 30 has, as described above, a two-split structure and so can be mounted in any position of the composite wire rod 20 and after being mounted, covers the entire circumference of the composite wire rod 20 and has an external shape of an approximate truncated cone.

The divided wedge body 40 is formed as described below. That is, 3D CAD data having a composite wire rod in the same structure as that of the composite wire rod 20 having the aforementioned twist structure of 1×7 of 15.2 mm in outside diameter as a prototype is created or the external shape thereof is scanned using a 3D scanner or the like for conversion into data. A mother die is created based on the data. A sand mold is formed from the mother die and then the divided wedge body 40 is produced by casting. The material thereof is spheroidal graphite cast iron superior in moldability, strength, toughness, and fatigue strength. Spheroidal graphite cast iron has a coefficient of contraction of 1%, which is small compared with 3% of steel, and accuracy of dimension thereof is high. While fatigue cracks evolve between layers in gray cast iron in which graphite is flaky and so fatigue strength is low, fatigue strength of spheroidal graphite cast iron is high because fatigue cracks stop at spheroidal graphite. Further, the surface of the inner wall surface of the wedge body is provided with finely irregular properties in the range of 60 to 500 μm in Rz.

The surface roughness Rz of the inner wall surface 42 of the divided wedge body 40 is measured using a stylus type surface roughness meter.

More specifically, the inner surface of the divided wedge body 40 has the following strand-like knot. The strand-like knot created by the transfer of the external shape of the wire 21 is an arc whose diameter is 5.1 mm and having an angle of 18° or less with respect to the core wire 21a. Further, the fine irregularities 42b are formed on the inner wall surface.

The irregularity portion 42a on the inner surface of the divided wedge body 40 has a shape imitating the shape of the composite wire rod 20 and thus, when mounted on the composite wire rod 20, the composite wire rod 20 and the knot match and the knot on the surface due to the twist structure of the composite wire rod 20 is filled with the divided wedge body 40.

A pair of the divided wedge bodies 40 is adjacent with the divided surfaces 43 facing each other, but a gap S of a predetermined dimension is formed. The predetermined dimension is 3 to 6 mm.

The wedge body 30 has a structure in which the outside diameter thereof expands from the tip portion toward the back end portion and the composite wire rod 20 is engaged with a hollow portion thereof.

The end fixing structure 10 of such a composite wire rod is assembled as described below. That is, the sleeve 50 is passed to the outer circumference of the composite wire rod 20. Next, the pair of divided wedge bodies 40 is fitted to the composite wire rod 20 with the tip portion thereof pointing to the side of the sleeve 50 to form the wedge body 30. Then, the sleeve 50 is moved toward the wedge body 30 to fit thereinto.

According to the end fixing structure 10 of the composite wire rod configured as described above, the action when the composite wire rod 20 is pulled is as described below. That is, the composite wire rod 20 and the wedge body 30 are integrated and thus, the composite wire rod 20 is pulled and at the same time, the wedge body 30 is drawn to the sleeve 50. When the wedge body 30 is drawn to the sleeve 50, the wedge body 30 tightens the composite wire rod 20 due to its gradient. The frictional force of each of the wedge body 30 and the composite wire rod 20 further increases due to this tightening and both are integrated more firmly.

Further, irregularities obtained by transferring the external shape of the wires 21 constituting the composite wire rod 20 are formed on the inner surface of the divided wedge body 40 obtained by the above method by using the composite wire rod 20 as a prototype. With these irregularities, the wedge body 30 is firmly engaged with the composite wire rod 20 and no resin cushioning material is used therefore, a strong gripping force can be obtained for a long period of time.

The sleeve 50 is made of metal, has an inner structure of a conical hollow whose diameter expands from the tip portion toward the back end portion, and is formed in a cylindrical shape whose outside diameter is fixed. Compared with the expanding angle C of the inside diameter of the sleeve 50, the expanding angle of the outside diameter of the wedge body 30 is made slightly larger. Accordingly, the lateral pressure on the mouth side (on the side on which a tensile force acts, the tip portion) can be made smaller and stress concentration on the mouth can be reduced so that a strong gripping force can be obtained. In addition to the above shape, the mouth is R-processed in the expanding portion 44 and the vicinity of the mouth is tapered (expanded) toward the side of the tip portion, further enhancing the effect.

Further, the wedge body 30 is a simple two-split molded body in a cylindrical shape and thus, no special preparations are needed and the wedge body can easily be mounted on the composite wire rod 20 in a short time. In addition, the inner surface of the wedge body 30 has a shape fitting to the composite wire rod 20 and thus, when mounted, the wedge body 30 fits to the composite wire rod 20 by itself by pressing the wedge body against the composite wire rod 20. Therefore, special skills are not needed and predetermined quality can easily be realized by a common worker.

According to the end fixing structure 10 of a composite wire rod in the present embodiment, a fixing force is generated by, instead of a compressive force by a compression apparatus, a tightening force by the wedge body 30 and the sleeve 50. The composite wire rod 20 is firmly tightened by tightening of the wedge body 30 so that a high level of fixing force can be achieved.

In addition, the wedge body 30 is formed in a shape fitting to the external shape of the composite wire rod 20 and therefore, only covering work is needed and predetermined quality can be gained without depending on work of a skilled worker so that fixing work can be done easily.

Incidentally, the present invention is not limited to the above embodiment. For example, the wedge body may have a three-split or four-split structure. In addition, various modifications can naturally be made without deviating from the spirit of the present invention.

INDUSTRIAL APPLICABILITY

An end fixing structure of a composite wire rod capable of easily performing fixing work due to a structure that maintains a sufficient frictional force without using a compression apparatus or a cushioning material can be obtained.

The invention claimed is:
1. An end fixing structure of a composite wire rod formed by converting continuous fiber into composite fiber using resins and molding the composite fiber like a stranded wire, the end fixing structure comprising:
   a wedge body formed in a cylindrical shape, wherein an outside diameter of the wedge body expands from a tip portion subject to a tensile force toward a back end portion on a fixed side, and wherein the wedge body has an engaged portion on an inner wall surface thereof, the engaged portion having a shape that conforms to an outer surface of the composite wire rod for engagement with the composite wire rod; and a sleeve provided on an outer circumferential side of the wedge body and having an internal structure of a conical hollow whose diameter expands toward the back end portion on the fixed side of the wedge body, wherein the wedge body is formed from a plurality of divided wedge bodies divided in a circumferential direction and formed with divided surfaces opposed to each other and having a gap therebetween, wherein the inner wall surface of each of the plurality of divided wedge bodies is formed from a fine irregular surface, wherein a surface roughness of irregularities on the inner wall surface of each of the plurality of divided wedge bodies is in a range of 60 to 500 μm, and wherein a length of the wedge body is 72 to 134% of a pitch of a side wire.

2. The end fixing structure of the composite wire rod according to claim 1, wherein a material of the wedge body is spheroidal graphite cast iron having a coefficient of contraction of about 1%.

3. The end fixing structure of the composite wire rod according to claim 1, wherein in the end fixing structure using the wedge body, compared with an expanding angle of the outside diameter of the wedge body, an expanding angle of an inside diameter of the sleeve is formed equally or less, and an inside diameter on a side of a tip portion of the engaged portion is smoothly expanded.

* * * * *